(12) United States Patent
Tsuda et al.

(10) Patent No.: US 6,842,977 B2
(45) Date of Patent: Jan. 18, 2005

(54) METHOD OF MANUFACTURING METALLIC WIRE SEGMENT

(75) Inventors: Sachiyo Tsuda, Kariya (JP); Hiroyuki Dekita, Toyota (JP); Hisashi Kobayashi, Kariya (JP); Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 428 days.

(21) Appl. No.: 09/989,435

(22) Filed: Nov. 21, 2001

(65) Prior Publication Data

US 2002/0069527 A1 Jun. 13, 2002

(30) Foreign Application Priority Data

Dec. 13, 2000 (JP) ........................................ 2000-379074
Sep. 17, 2001 (JP) ........................................ 2001-281970

(51) Int. Cl.$^7$ .......................... H01R 43/04; H02K 15/08
(52) U.S. Cl. .............................. 29/871; 29/868; 29/598; 29/33 F; 140/105
(58) Field of Search ........................ 29/596, 598, 33 F, 29/868, 871, 882; 470/40; 140/105; 72/369, 370.03; 604/174, 179, 270, 317, 327–329, 331–332, 341, 351, 352–353, 907, 908, 910; 128/DIG. 6, 26, 15; 602/19, 36

(56) References Cited

U.S. PATENT DOCUMENTS 1,742,190 A * 1/1930 Apple .......................... 29/598

FOREIGN PATENT DOCUMENTS

| EP | 2165612 | * | 4/1986 | ................ 470/40 X |
| JP | 55-54234 | * | 4/1980 | ................. 140/105 |
| JP | A 8-140324 | | 5/1996 | |

* cited by examiner

Primary Examiner—A. Dexter Tugbang
(74) Attorney, Agent, or Firm—Oliff & Berridge, PLC

(57) ABSTRACT

One end of a metallic wire having a rectangular cross-section is widened by upsetting the end of the wire in its axial direction. At the same time, a swollen portion is formed at a position where the widened end portion is to be bent from a straight portion of the wire. Then, the widened end portion is bent at the bending position having the swollen portion. Thus, a metallic wire segment having the widened end portion bent at the bending position is manufactured without wasting any part of wire material, while avoiding formation of cracks on the outer surface of the bending position. Plural wire segments thus manufactured are combined to form a rotor winding of a rotational electric machine, forming a commutator surface by the widened end portions at the same time.

9 Claims, 7 Drawing Sheets

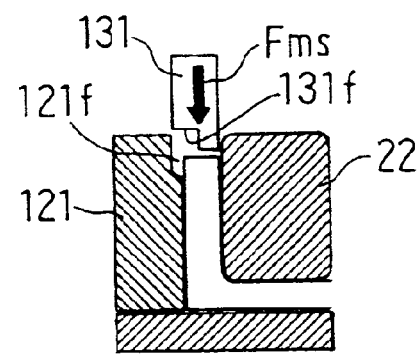
FIG. 4A
FIG. 4B
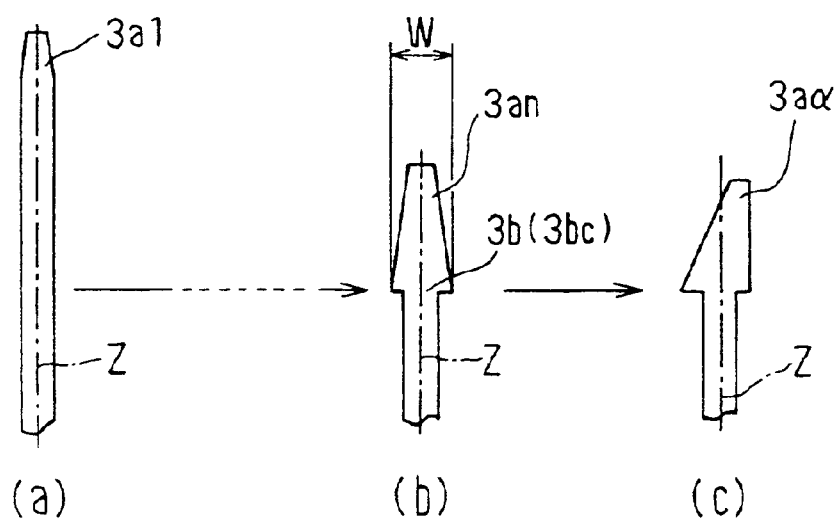
FIG. 5

METHOD OF MANUFACTURING METALLIC WIRE SEGMENT

CROSS-REFERENCE TO RELATED APPLICATIONS

This application is based upon and claims benefit of priority of Japanese Patent Applications No. 2000-379074 filed on Dec. 13, 2000 and No. 2001-281970 filed on Sep. 17, 2001, the contents of which are incorporated herein by reference.

BACKGROUND OF THE INVENTION

1. Field of the Invention

The present invention relates to a method of manufacturing a metallic wire segment which includes a widened end portion bent from a straight portion. The metallic wire segment is used, for example, as a conductor segment forming a winding in a rotor of a rotational electric machine.

2. Description of Related Art

A metallic wire segment having a wide end portion bent from a narrow body portion is manufactured from a metallic wire having a uniform rectangular cross-section. Conventionally, the narrow body portion is formed by stamping off both sides of metallic wire having a flat rectangular cross-section. Then, the wide end portion is bent from the narrow body portion. However, such a conventional method is inappropriate in economical and environmental standpoints, because metallic material stamped-off from the wire is wasted.

SUMMARY OF THE INVENTION

The present invention has been made in view of the above-mentioned problem, and an object of the present invention is to provide an improved method of manufacturing a metallic wire segment having a widened end portion bent from a narrow body portion. In the improved method, the metallic wire segment is economically manufactured without wasting material, and the widened end portion is smoothly bent without forming cracks at a bending position.

A metallic wire having a uniform cross-section is firmly held in a die, and one end of the wire is upset in a direction of the wire axis. In the upsetting process, the end of the wire is widened to form a widened end portion. At the same time, a swollen portion is formed on a rear surface of the wire where the widened end portion is to be bent toward a front surface of the wire. Then, the widened end portion is bent toward the front surface of the wire, while firmly holding the widened end portion and the swollen portion in a die. In the bending process, the swollen portion positioned on an outer surface of the bending position supplies material for making a large outer radius at the bending position, thereby avoiding formation of cracks on the outer surface of the bending position.

Preferably, a process for heading the widened end portion is performed after the bending process. The metallic material around the bending position is further compressed by performing the heading process, and thereby formation of the cracks on the outer surface of the bending position is surely avoided. It is further preferable to make the swollen portion with a thickness ranging from 1.3 times to 1.6 times of a thickness of the metallic wire. The upsetting process may be performed in a single process or in several processes according to an amount of upsetting required. The widened end portion may be made in an asymmetrical shape relative to the axis of the metallic wire and may be further upset to form a slant angle relative to the axis of the metallic wire. A projected end may be formed at the end of the widened end portion in the heading process.

Plural wire segments manufactured by the method of present invention may be combined to form a rotor winding of a rotational electric machine, so that the widened end portions of the segments form a commutator surface of the rotor.

According to the present invention, the end portion of the segment is widened by the upsetting process without wasting any part of the wire material, and the widened end portion is bent at the bending position having the swollen portion formed by the upsetting process. Therefore, the widened end portion is bent from the straight body portion of the wire segment without forming cracks or crevices.

Other objects and features of the present invention will become more readily apparent from a better understanding of the preferred embodiments described below with reference to the following drawings.

BRIEF DESCRIPTION OF THE DRAWINGS

FIGS. 4A and 4B are cross-sectional views showing a modified form of the heading process shown in FIG. 1D;

FIG. 5 shows a modified form of the upsetting process shown in FIGS. 1A and 1B;

DETAILED DESCRIPTION OF THE PREFERRED EMBODIMENTS

Figure 1A:
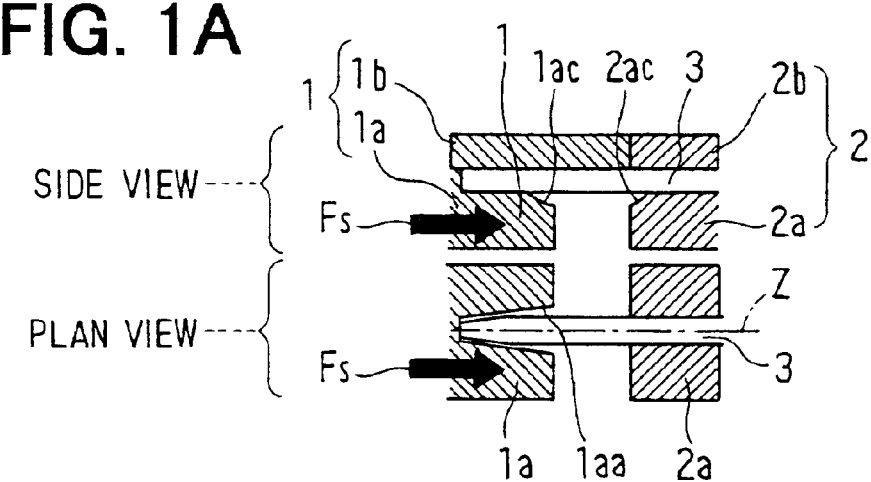
FIG. 1A is a cross-sectional view showing a first die and a first punch for forming a widened end portion and a swollen portion of a segment by upsetting one end of a metallic wire, as a first embodiment of the present invention.
Figure 1B:
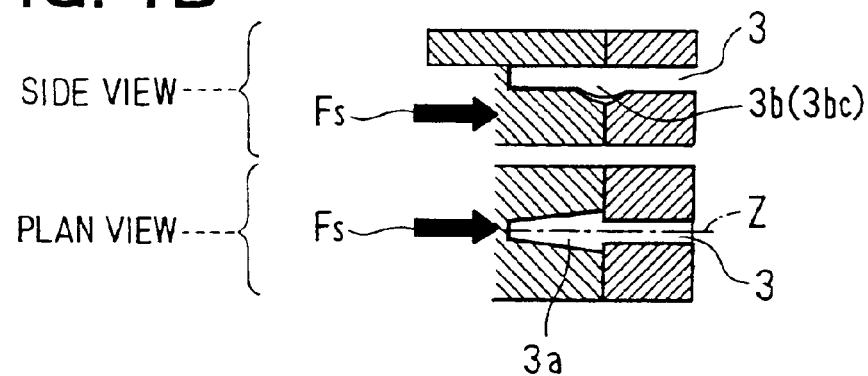
FIG. 1B shows a final stage of an upsetting process, where the widened end portion and the swollen portion are completed.

A first embodiment of the present invention will be described with reference to FIGS. 1A–3. First, referring to FIGS. 2A and 2B, a shape of a metallic wire segment will be described. The segment is formed from a metallic wire 3 having a substantially rectangular cross-section. The metallic wire 3 is made of a conductive material such as copper. The thickness of the metallic wire 3 is t as shown in FIG. 2A. The width of the metallic wire 3 is w as shown in FIG. 2B. By upsetting one end of the metallic wire 3, a swollen portion 3bc having a thickness T is formed on a rear surface of the metallic wire 3 at a bending position 3b, as shown in FIG. 2A. At the same time, a widened end portion 3a having a chin 3ab (its width is W) is formed, as shown in FIG. 2B. The upsetting process is performed by applying a mechanical force to one end of the metallic wire 3 in its axial direction Z. After the swollen portion 3bc and the widened end portion 3a are formed by upsetting one end of the metallic wire 3, the widened end portion 3a is bent toward the front surface of the metallic wire 3 at the bending position 3b.

Now, referring to FIGS. 1A–1D, a method of manufacturing the metallic wire segment will be described. An upper part of FIG. 1A shows a side view of a first die 2 composed of a front die 2b and a rear die 2a, and a first punch 1 composed of a front punch 1b and a rear punch 1a. A lower part of FIG. 1A shows a plan view of the rear die 2a and the rear punch 1a. The front and the rear dies 2b, 2a are stationary dies, while the front and the rear punches 1b, 1a are movable punches moving toward the stationary dies. As shown in FIG. 1A, the front die 2b and the front punch 1b are positioned in contact to each other, while the rear die 2a and the rear punch 1a are positioned apart from each other with a predetermined space.

The metallic wire 3 is placed so that its front surface contacts the front die 2b and the front punch 1b and its rear surface contacts the rear die 2a and the rear punch 1a. The metallic wire 3 are firmly held between a pair of the rear dies 2a positioned at both sides of the metallic wire 3. A tapered corner 2ac is formed on the rear die 2a, and another tapered corner 1ac is formed on the rear punch 1a, as shown in the side view in FIG. 1A. The tapered corners 2ac and 1ac provide a space for forming the swollen portion 3bc in the upsetting process. A slanted surface 1aa is formed on each of the rear punch 1a. The pair of the slanted surfaces provides a space in which the end portion of the metallic wire 3 is widened to form the widened end portion 3a.

After setting the first die 2, the first punch 1 and the metallic wire 3 at the position shown in FIG. 1A, an upsetting force Fs is applied to the pair of rear punches 1a in the axial direction Z, as shown in FIG. 1A. The pair of first punches 1a is moved to the position shown in FIG. 1B, thereby forming the swollen portion 3bc on the rear surface of the metallic wire 3 and the widened end portion 3a. In this upsetting process, the end portion of the metallic wire 3 is pressed by the upsetting force, widening the end portion of the wire 3 and swelling a part of the rear surface of the wire 3. The widened end portion 3a and the swollen portion 3bc may be formed by a single stroke of the pair of the rear punches 1a, or the stroke may be divided into several strokes. An upsetting amount (an amount of material pressed) by one stroke is set so that no buckling occurs in the upset material. To form the widened end portion 3a and the swollen portion 3bc in a large size, the upsetting is performed several times. On the other hand, the upsetting is performed in a single stroke to form them in a small size.

Figure 1C:
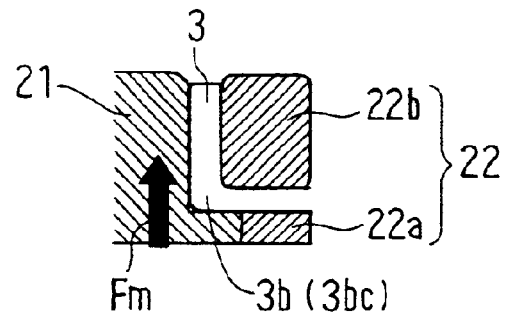
FIG. 1C is a cross-sectional view showing a second die and a second punch for bending the widened end portion.
Figure 2A:
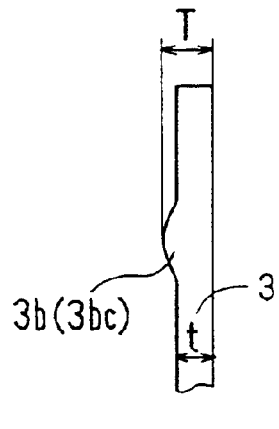
FIG. 2A is a side view showing the swollen portion formed in the process shown in FIG. 1B.
Figure 2B:
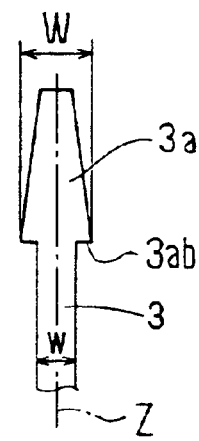
FIG. 2B is a plan view showing the widened end portion formed in the process shown in FIG. 1B.

FIG. 1C shows a process for bending the widened end portion 3a toward the front surface of the metallic wire 3 at the bending position 3b. The metallic wire 3 on which the widened end portion 3a and the swollen portion 3bc are formed in the upsetting process is firmly held by a second die 22. The second die 22 is composed of a front die 22b and a rear die 22a. The widened end portion 3a is bent at the bending position 3b where the swollen portion 3bc is formed by pressing up a second punch 21 with a bending force Fm. A front surface of the second punch 21 is first aligned with the rear surface of the metallic wire 3, and then the second punch 21 is forcibly moved up, as shown in FIG. 1C.

Generally, a metallic material is hardened by a plastic deformation process such as upsetting, heading, forging or the like. Accordingly, the bending portion 3b is hardened by the upsetting process. In addition, a tensile stress is generated at the bending position 3b, especially on its outer surface, in the bending process. If an excessive tensile stress is imposed on the outer surface of the bending position 3b, it is highly possible that cracks or crevices are formed on that surface. To avoid this problem, the swollen portion 3bc is formed on the rear surface of the bending position 3b. The swollen portion 3bc supplies a sufficient amount of material to the outer surface of the bending position 3b. Further, the bending position 3b is firmly held between the second die 22 and the second punch 21 during the bending process. In this manner, a compressive force is imposed on the swollen portion 3bc. The compressive force cancels the tensile force imposed on the outer surface of the bending position 3b generated in the bending process, or at least the tensile force is alleviated. The cracks or the crevices otherwise formed on the outer surface of the bending position 3b are avoided by making the swollen portion 3bc and firmly holding the bending position 3b during the bending process.

Figure 1D:
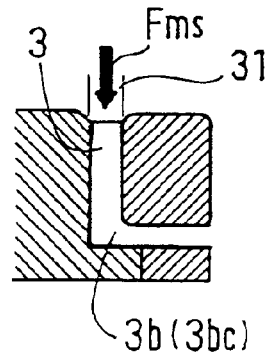
FIG. 1D is a cross-sectional view showing a third punch for heading a top of the widened end portion.

After the bending process shown in FIG. 1C is completed, it is preferable to perform a heading process shown in FIG. 1D. In this process, the upper end of the widened end portion 3a is pressed down by a third punch 31 with a heading force Fms. The bending position 3b is further compressed by the heading force Fms, and a compressive force is applied to the bending position 3b, thereby to further alleviate the tensile stress imposed on the outer surface of the bending position 3b.

Figure 3:
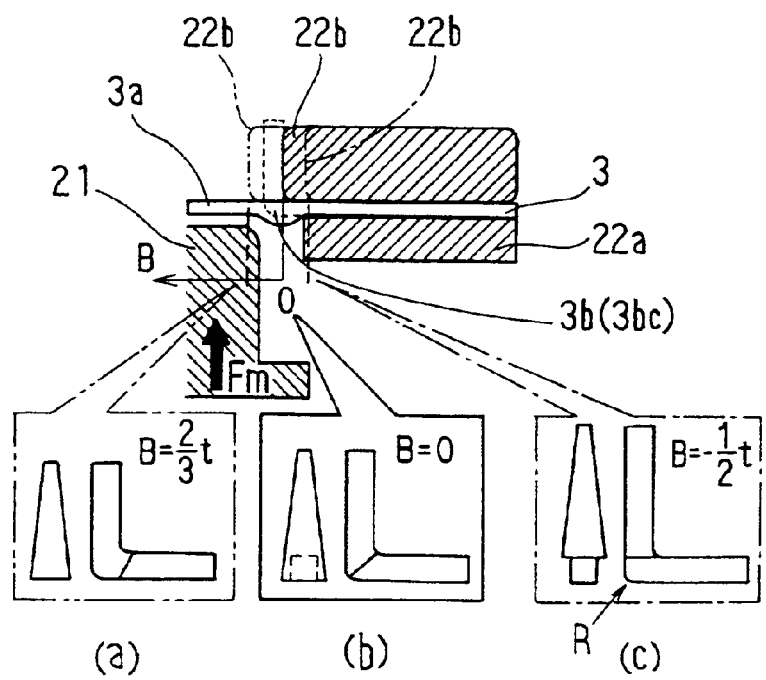
FIG. 3 is a schematic view showing the bending process shown in FIG. 1D, in which a bending position is variously changed.

In the bending process shown in FIG. 1C, the widened end portion 3a may not be exactly bent at the bending position 3b which corresponds to the position of chin 3ab. A tolerable deviation of an actually bent position from the bending position 3b will be explained with reference to FIG. 3. In FIG. 3, the deviation of the actually bent position from the bending position 3b is denoted by B. If the widened end portion 3a is exactly bent at the bending position 3b, the deviation B is zero (0). If it is bent at a forward position (a leftward position in FIG. 3), B is a plus value, while it is bent at a backward position (a rightward position in FIG. 3), B is a minus value.

It is found out through experiments it is preferable to set the deviation B in a range of plus (⅔)·t to minus (½)·t, i.e., (⅔)·t>B>−(½)·t, where t is the thickness of the metallic wire 3. If B is larger than (⅔)·t (shown in (a) in FIG. 3), the material of the swollen portion 3bc is not effectively supplied to the outer surface of the actually bent position because some part of the material remains on the rear surface of the metallic wire 3. Similarly, if the deviation B is smaller than −(½)·t (shown in (c) in FIG. 3), the material of the swollen portion 3bc is not effectively utilized, leaving a larger radius R on the outer surface of the actually bent position. It is, of course, ideal if the widened end portion 3a is actually bent at the bending position 3b as shown in (b) in FIG. 3.

After the upsetting process shown in FIG. 1B is completed, the first die 2 and the first punch 1 are replaced with the second die 22 and the second punch 21 to perform the bending process. Since the deviation B is allowable in the range described above, the second die 22 and the second punch 21 are easily set for the bending process.

Figure 11:
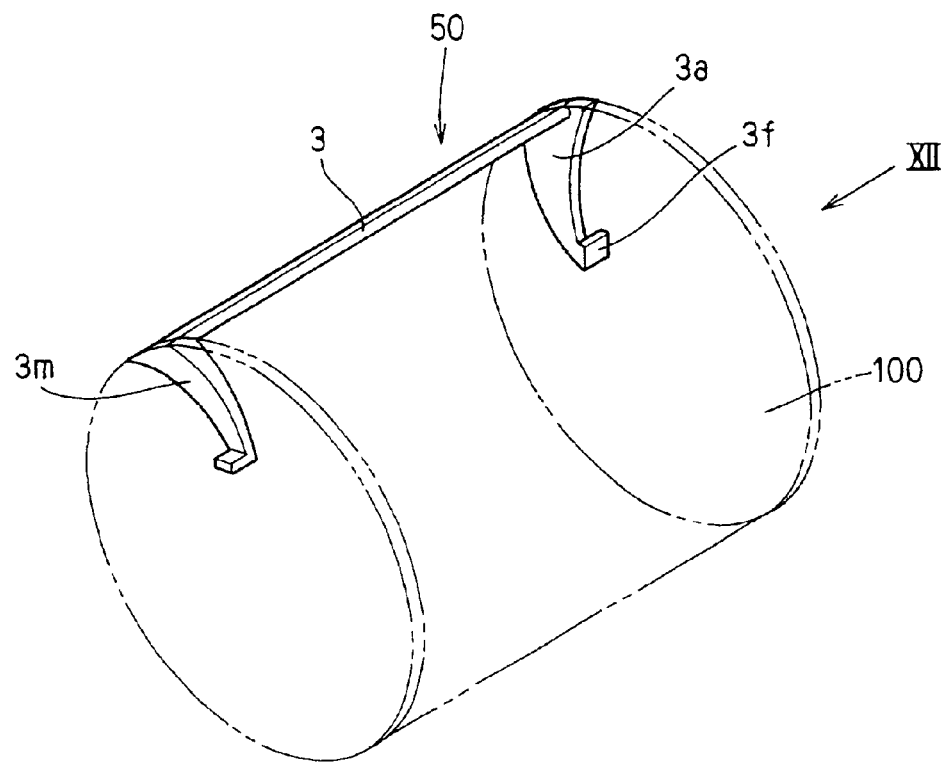
FIG. 11 is a perspective view schematically showing the rotor in which the metallic wire segment is used as a conductor.
Figure 12:
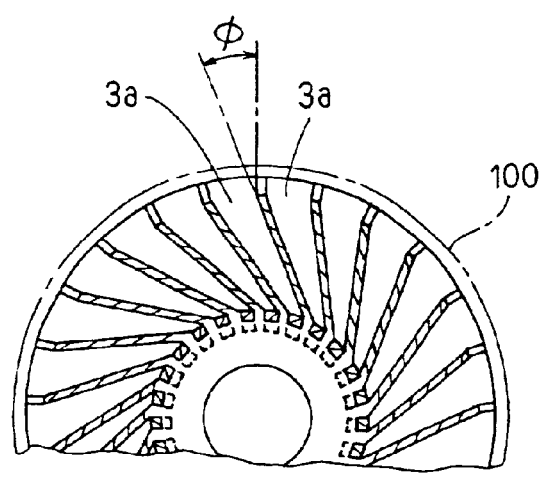
FIG. 12 is a plan view showing a side surface of the rotor, viewed in direction XII shown in FIG. 11.

The heading process shown in FIG. 1D may be modified to a form shown in FIGS. 4A and 4B. In this modified form, a projected end 3f (shown in FIG. 4B) is formed in the heading process. The projected end 3f is used for forming a rotor winding as shown in FIGS. 11 and 12. As shown in FIG. 4A, a depression 131f is formed on the tip of the third die 131, and a cutout 121f is formed on the top portion of the second punch 121. By applying the heading force Fms, as shown in FIG. 4B, the projected end 3f is formed in the heading process.

The upsetting process shown in FIGS. 1A and 1B may be modified to a form shown in FIG. 5. In this modified upsetting process, the widened end portion 3a is formed in an asymmetric shape 3a α (shown in (c) in FIG. 5). To form the widened end portion 3an shown in (b) together with the swollen portion 3bc, the upsetting process is divided into n steps (a few or several steps) so that the widened end portion 3a1 (shown in (a)) is gradually deformed into the shape of 3an. After the widened end portion is formed into the shape of 3an, it is further deformed into the asymmetric shape 3a α by performing one more upsetting. Since the widened end portion is deformed from the shape 3a1 to the shape 3an, keeping a symmetric shape, the number n of upsetting steps can be smaller, compared with the case in which the asymmetric shape is formed from the beginning.

The trapezoidal shape of the widened end portion 3a may be modified to other shapes such as a rectangular or a semi-round shape.

Figure 7:
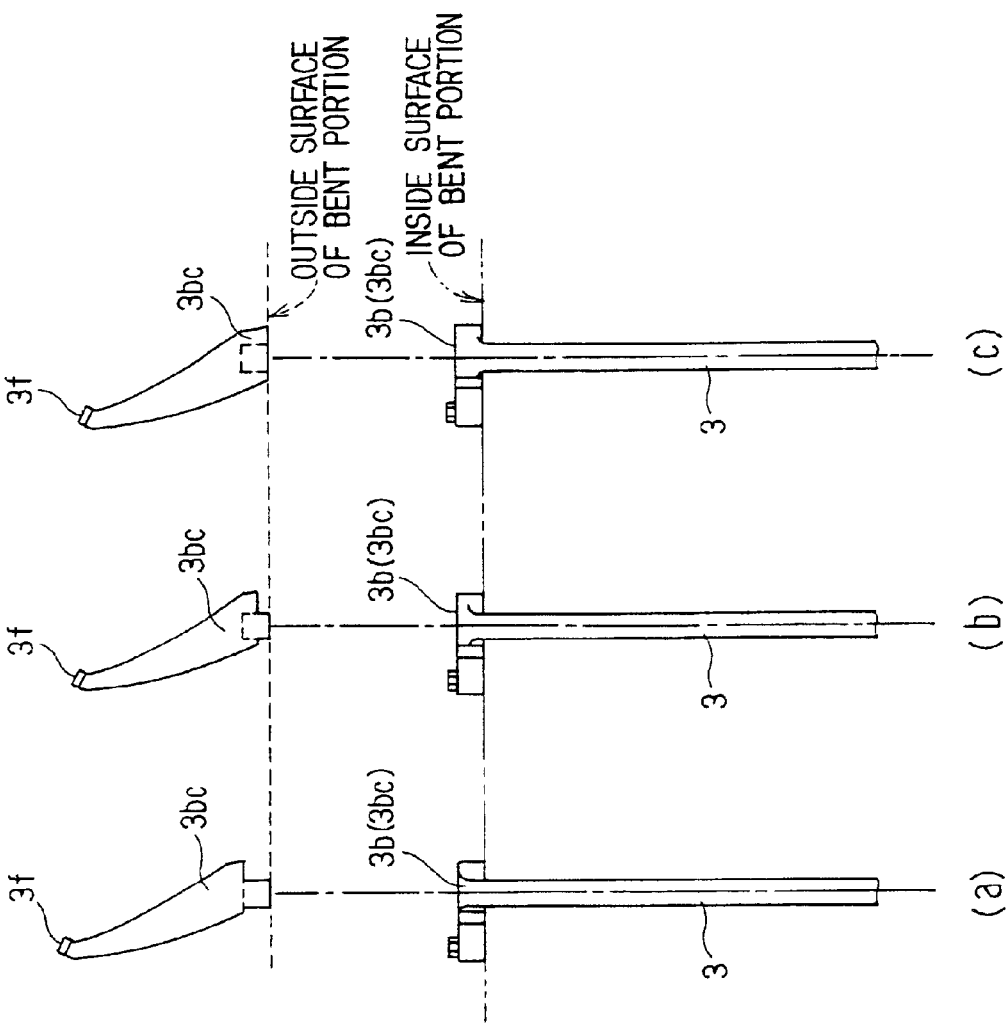
FIG. 7 is a cross-sectional view showing a die and a punch used in the last step of the process shown in FIG. 6.
Figure 8:
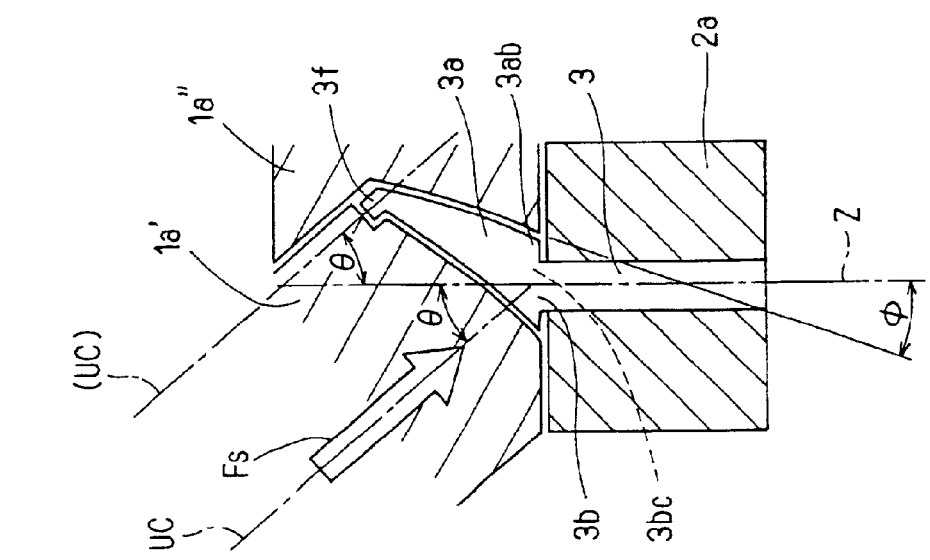
FIG. 8 shows details of the bending process performed in the second embodiment.

A second embodiment of the present invention will be described with reference to FIGS. 6–8. In order to form a rotor winding by combining plural metallic wire segments 50, as shown in FIGS. 11 and 12, it is often required to form the widened end portion 3a in an asymmetric shape and with an angle φ slanted relative to the longitudinal axis Z of the metallic wire 3. The asymmetric widened end portion 3a having the slant angle φ is shown in FIG. 6(e).

Figure 6:
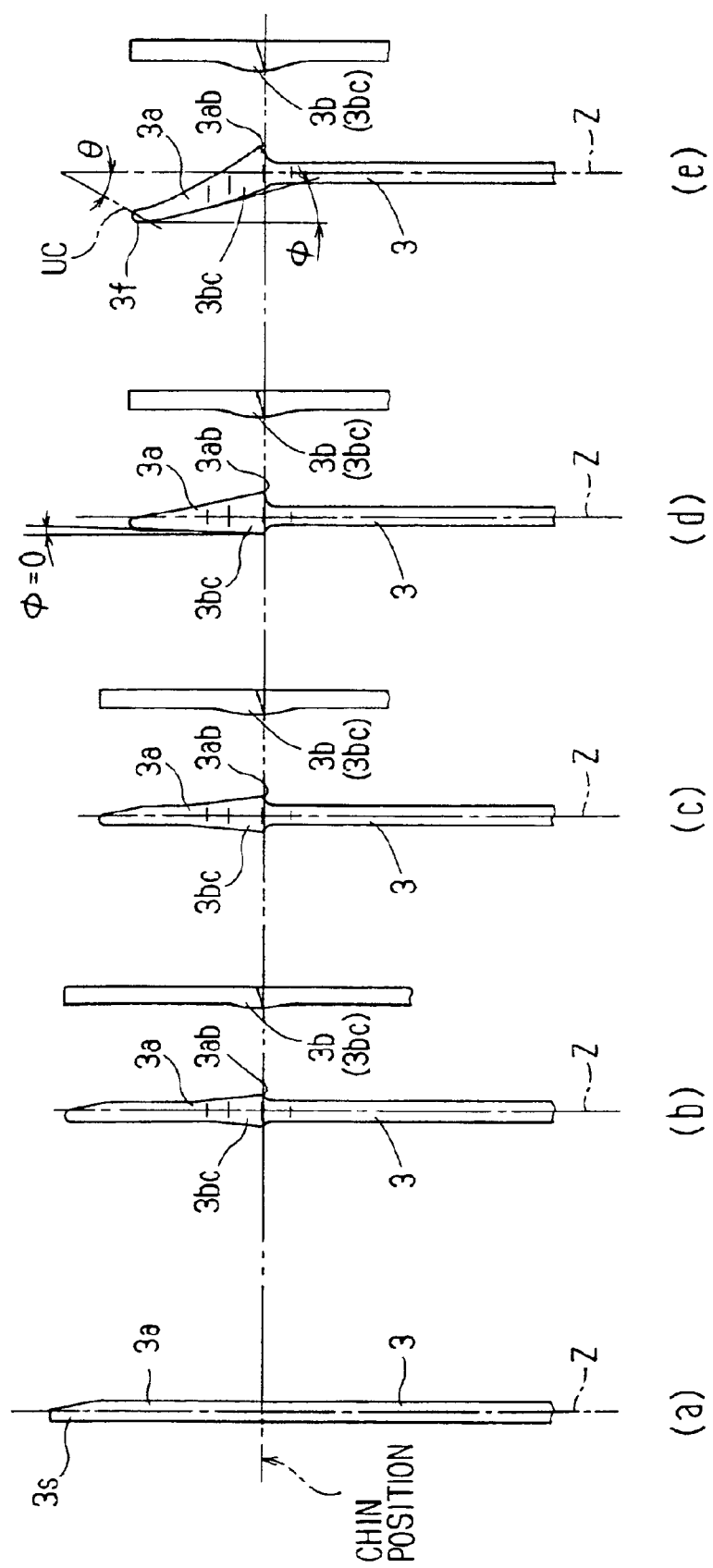
FIG. 6 shows a process of forming the widened end portion with a slant angle, as a second embodiment of the present invention.

FIG. 6 shows a process for forming the widened end portion 3a in such a shape by upsetting the end of the metallic wire 3. In this embodiment, the upsetting process is divided into three steps (b), (c) and (d) in FIG. 6.

Before the upsetting process, a preliminary step for making a tapered portion 3s at the tip of the metallic wire 3 is performed as shown in FIG. 6(a). The tapered portion 3s is formed so that it can be easily deformed into the asymmetric shape shown in FIG. 6(d) by upsetting the tapered portion 3s. The tapered portion 3s may be formed by presswork or plastic deformation. If the tapered portion is formed by presswork, an amount of waste material is very small. After the upsetting process is completed through (b)–(d), the widened end portion 3a is further deformed into a shape having the slant angle φ, as shown in FIG. 6(e). The three steps (b), (c) and (d) of the upsetting process are similarly performed as in the first embodiment. The swollen portion 3bc at the bending portion 3b (shown in side views in the respective steps) are also formed in the same upsetting process.

The step of forming the slant angle φ shown in FIG. 6(e) will be described in detail with reference to FIG. 7. As shown in FIG. 7, the straight portion of the wire 3 is firmly held in the die 2a which is common to the die in the upsetting process. A punch for forming the slant angle φ is composed of a holding punch 1a" that supports one side of the widened end portion 3a and a pressing punch 1a' that presses the other side of the widened end portion 3a in a direction UC. The direction UC, making an angle θ with the axis direction Z, is set so that the widened end portion 3a is bent with the slant angle φ relative to the axis direction Z. A pressing force Fs is applied to the widened end portion 3a through the pressing punch 1a', thereby forming the slant angle φ.

It is also possible to make the projected end 3f at the tip of the widened end portion 3a together with forming the slant angle φ. In this case, a depression corresponding to the projected end 3f is formed at a corner of the pressing punch 1a', as shown in FIG. 7. Though the swollen portion 3bc formed in the upsetting process is not shown in FIG. 7, it is positioned at the rear side.

After the asymmetrically widened end portion 3a slanted with a slant angle φ and the swollen portion 3bc are formed through the process shown in FIG. 6, the widened end portion 3a is bent in the same manner as in the first embodiment. Then, preferably, the same heading process as in the first embodiment is performed. In this embodiment, however, the heading force Fms has to be properly set, considering the slant angle φ. FIG. 8 shows the states of the bending portion 3b having the swollen portion 3bc after the widened end portion 3a is bent.

It is found out through experiments that the cracks or crevices on the outer surface of the bending portion 3b are prevented, if the thickness T of the swollen portion 3bc relative to the thickness t of the metallic wire 3 satisfies the following relation: $1.3<T/t<1.6$. If the ratio T/t is smaller than 1.3, an amount of material in the swollen portion 3bc is too small to compensate the expansion of the outer surface of the bending portion 3b. If the ratio T/t is larger than 1.6, an amount of material in the swollen portion 3bc is too large, and the excessive material is squeezed out to the widened end portion 3a.

Figure 9A:
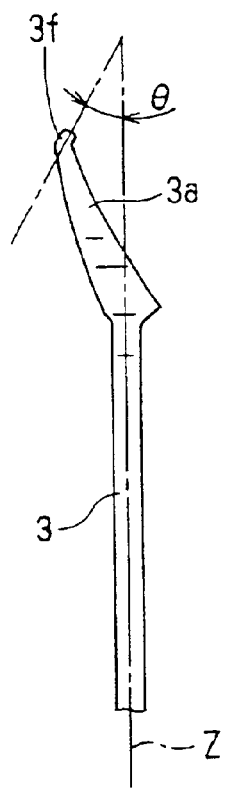
FIG. 9A shows a modified form of the widened end portion that includes a projected end.
Figure 9B:
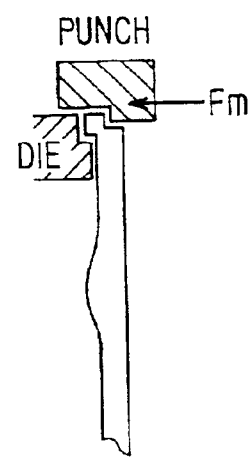
FIG. 9B is a schematic view showing a die and a punch for forming the projected end shown in FIG. 9A.

The projected end 3f formed together with making the slant angle φ may be further processed to shape it into an accurate form in the process shown in FIGS. 9A and 9B. The projected end 3f is pressed between a die and a punch with a pressing force Fm.

Figure 10:
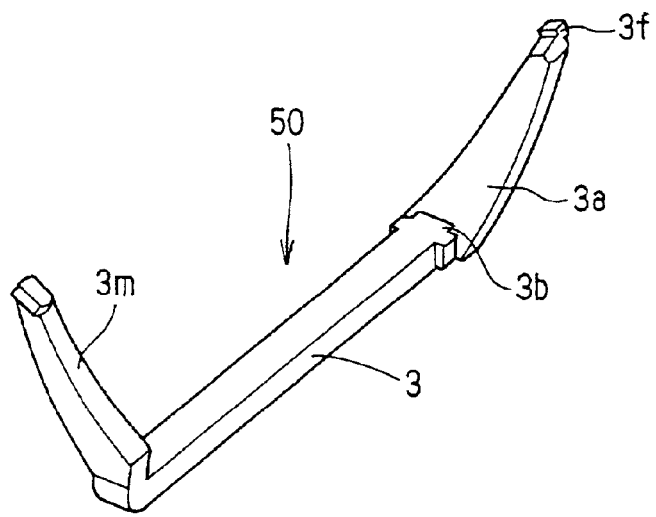
FIG. 10 is a perspective view showing a metallic wire segment which is used as a conductor in a rotor of a rotational electric machine.

A metallic wire segment 50 shown in FIG. 10 is manufactured through the processes described above. The segment 50 includes the straight wire portion 3, the widened end portion 3a and another end portion 3m. As shown in FIGS. 11 and 12, plural metallic wire segments 50 are installed on a rotor 100 of a rotational electric machine, forming a rotor winding. The side surface formed by the widened end portions 3a is used as a commutator surface of the rotor 100.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of manufacturing a wire segment from a metallic wire having a substantially rectangular cross-section and a front surface and a rear surface, the method comprising:

forming a widened end portion at one end of the wire and a swollen portion on the rear surface of the wire at a chin portion of the widened end portion by upsetting the wire in a longitudinal direction; and bending the wire at the widened end portion toward the front surface of the wire while tightly holding the widened end portion and the swollen portion in a die.

2. The method of manufacturing a wire segment as in claim 1, the method further including heading an end of the widened end portion toward the bending portion.

3. The method of manufacturing a wire segment as in claim 1, wherein:

a thickness T of the swollen portion is made to satisfy a formula: $1.3 < T/t < 1.6$, where t is a thickness of the metallic wire.

4. The method of manufacturing a wire segment as in claim 1, wherein:

the widened end portion is made in an asymmetrical shape with respect to an axis of the metallic wire by performing the upsetting step one or several times.

5. The method of manufacturing a wire segment as in claim 4, wherein:

the asymmetrically widened end portion is formed by performing the upsetting step several times, and then further bent to form a slant angle with respect to the axis of the metallic wire by performing the upsetting process one more time.

6. The method of manufacturing a wire segment as in claim 5, the method further comprising forming a tapered portion at one end of the metallic wire, the tapered portion having a tapered surface slanted in a direction corresponding to the slant angle, the tapered portion forming step being performed before the upsetting step.

7. The method of manufacturing a wire segment as in claim 2, wherein:

the heading includes forming a projected end at an end of the widened end portion.

8. The method of manufacturing a wire segment as in claim 5, wherein:

a projected end is formed at an end of the symmetrically widened end portion together with forming the slant angle.

9. A method of combining a plurality of the wire segments manufactured according to claim 1 to form a rotor winding of a rotational electric machine.

* * * * *